United States Patent [19]

Hallden et al.

[11] 4,215,746
[45] Aug. 5, 1980

[54] PRESSURE RESPONSIVE SAFETY SYSTEM FOR FLUID LINES

[75] Inventors: Donald F. Hallden, Garland; Clifford M. Peters; L. V. McCary, Jr., both of Longview, all of Tex.

[73] Assignee: W-K-M Wellhead Systems, Inc., Shreveport, La.

[21] Appl. No.: 53,134

[22] Filed: Jun. 28, 1979

[51] Int. Cl.³ .................. E21B 34/16; E21B 43/12; F16K 17/00; F16K 37/00
[52] U.S. Cl. .................. 166/53; 166/65 R; 166/66; 166/67; 137/458; 137/557
[58] Field of Search .............. 137/458, 456, 457, 461, 137/487.5; 166/65 R, 53, 67, 72, 75 R, 321, 319

[56] References Cited

U.S. PATENT DOCUMENTS

| | | | |
|---|---|---|---|
| 3,258,027 | 6/1966 | Willis | 137/458 |
| 3,419,076 | 12/1968 | Sizer et al. | 166/53 |
| 3,739,845 | 6/1973 | Berry et al. | 166/65 R |
| 3,768,506 | 10/1973 | McGill | 137/458 |
| 3,878,863 | 4/1975 | Snyder | 137/458 X |
| 3,920,040 | 11/1975 | Powell | 137/458 |
| 4,062,379 | 12/1977 | Clinton | 166/53 X |
| 4,082,147 | 4/1978 | Wolff et al. | 166/53 X |
| 4,109,714 | 8/1978 | Greenlee et al. | 166/53 |
| 4,150,721 | 4/1979 | Norwood | 166/65 R X |
| 4,174,729 | 11/1979 | Roark et al. | 137/487.5 |

Primary Examiner—Stephen J. Novosad
Attorney, Agent, or Firm—Eugene N. Riddle

[57] ABSTRACT

An electro-pneumatic or electro-hydraulic safety system for shutting in a well or the like in the event of unusual pressure conditions in the production line of the well. The safety system includes a pressure transducer (30) which senses the flowline pressure and provides a corresponding electrical signal to a digital controller (34). When the signal applied to the controller is outside of a preset range defined between low and high settings of the controller, a control circuit deenergizes a solenoid valve which bleeds fluid from a fluid actuator in order to close a surface safety valve (10). Once the safety valve has closed, the controller is latched out of service and must be manually reset before the safety valve can be opened. For protection of a subsurface safety valve (155), the safety system provides a time delay between opening of the subsurface valve and opening of the surface valve and also between closing of the surface valve and closing of the subsurface valve.

28 Claims, 4 Drawing Figures

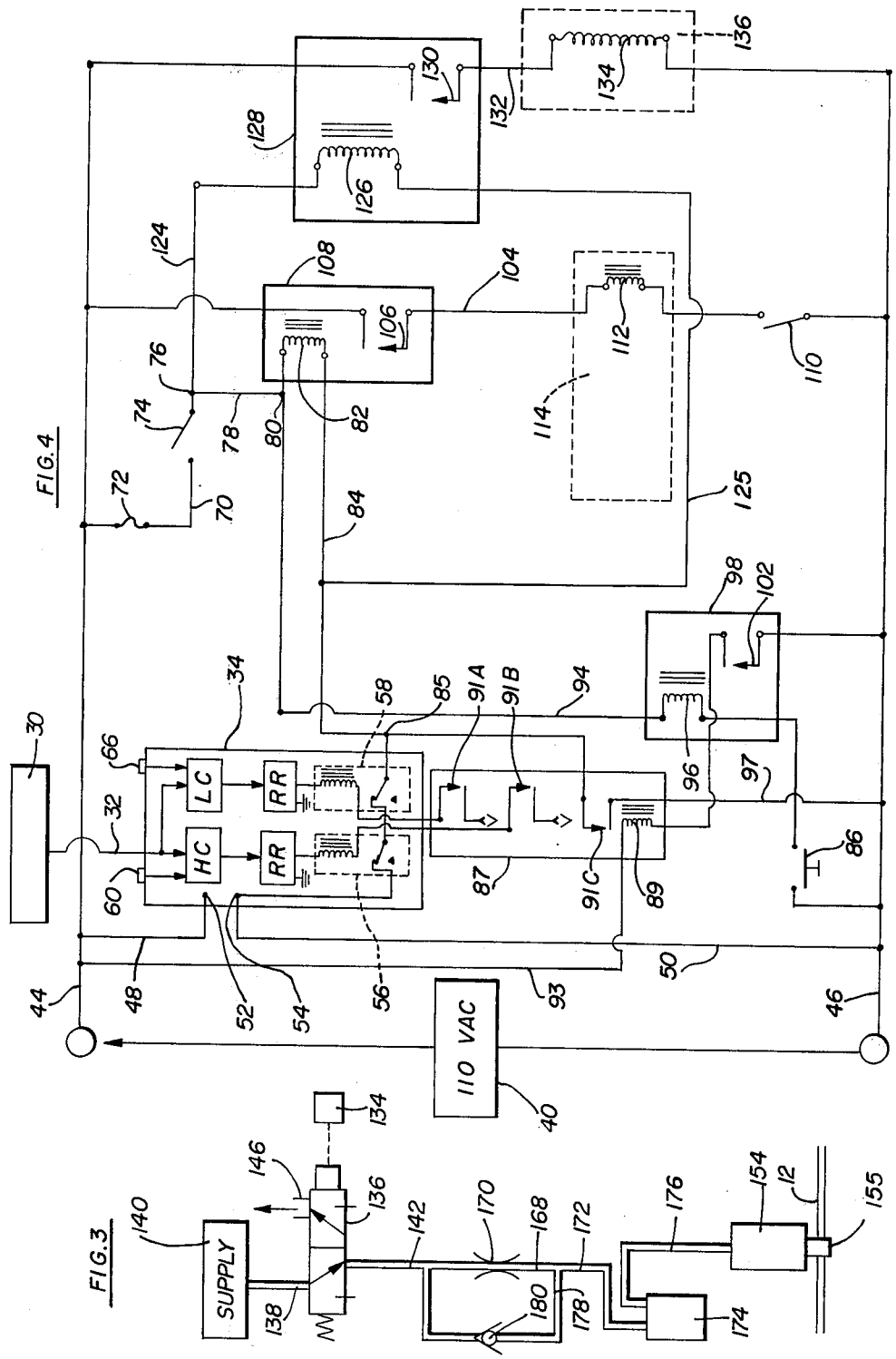

PRESSURE RESPONSIVE SAFETY SYSTEM FOR FLUID LINES

BACKGROUND OF THE INVENTION

This invention relates to a combined electrical and fluid operated control system for closing a fluid flowline in the event of unusual pressure conditions therein.

In the past, fluid operated safety systems have been used to shut-in oil and gas wells when the pressure in the production flowline of the well is unduly high or low. The safety system typically includes a gate valve on the wellhead and pneumatic pressure sensors on the flowline which fire in a manner to effect closing of the gate valve if the fluid pressure in the production line is outside of the operating range of the system. Although fluid systems of this type have functioned in a generally satisfactory manner, they have not been wholly free of problems. Perhaps most importantly, such systems require a number of pressure containing components which are susceptible to a variety of mechanical problems such as seal failure and the like. Also, long fluid lines are sometimes required and the cost and maintenance problems of the safety system are increased accordingly. Another problem has been to assure that the system is automatically locked out of service so that it must be manually reset once it has fired to shut-in the well. A lockout feature of this nature enhances the safety of the system in that it assures that the well will be shut-in until the defect is corrected and the safety system is returned to service by positively resetting it.

Along with the surface safety valve on the wellhead, it is common for producing wells to also have a subsurface safety valve which is typically a ball valve located down in the well bore a considerable distance below the surface. For economic reasons, it is important to protect the subsurface valve because of the high costs involved in repairing or replacing it, particularly when the well is in an inaccessible location such as in a subsea enviroment. Accordingly, for protection of the subsurface valve, it is desirable for the safety system to close the subsurface valve only after the surface valve has already been closed and to open the subsurface valve prior to opening of the surface safety valve.

SUMMARY OF THE INVENTION

It is the primary object of the present invention to provide a safety system for fluid flowlines which avoids many of the difficulties associated with the safety systems that have been used in the past. In accordance with the invention, the pressure in the flowline of a producing well is sensed by a pressure transducer which provides an electrical signal proportional to the sensed pressure. An electronic controller which receives the signal may be set to provide an output signal which shuts a fluid actuated surface safety valve whenever the sensed pressure is outside of a preset range. Relays included in the controller are latched open so that the controller must be maually reset in order to return it to service, thus providing the system with an automatic lockout feature. The control circuits are arranged to effect closing of the surface safety valve prior to closing of the subsurface safety valve, and to open the subsurface safety valve prior to opening of the surface valve upon start up of the system.

DETAILED DESCRIPTION OF THE INVENTION

In the accompanying drawings which form a part of the specification and are to be read in conjunction therewith:

FIG. 3 is a fragmentary schematic diagram of a fluid controlled delay arrangement that may be used to delay opening of the subsurface safety valve; and FIG. 4 is a schematic circuit diagram showing a modified control circuit which may be included in the safety system.

Figure 1:
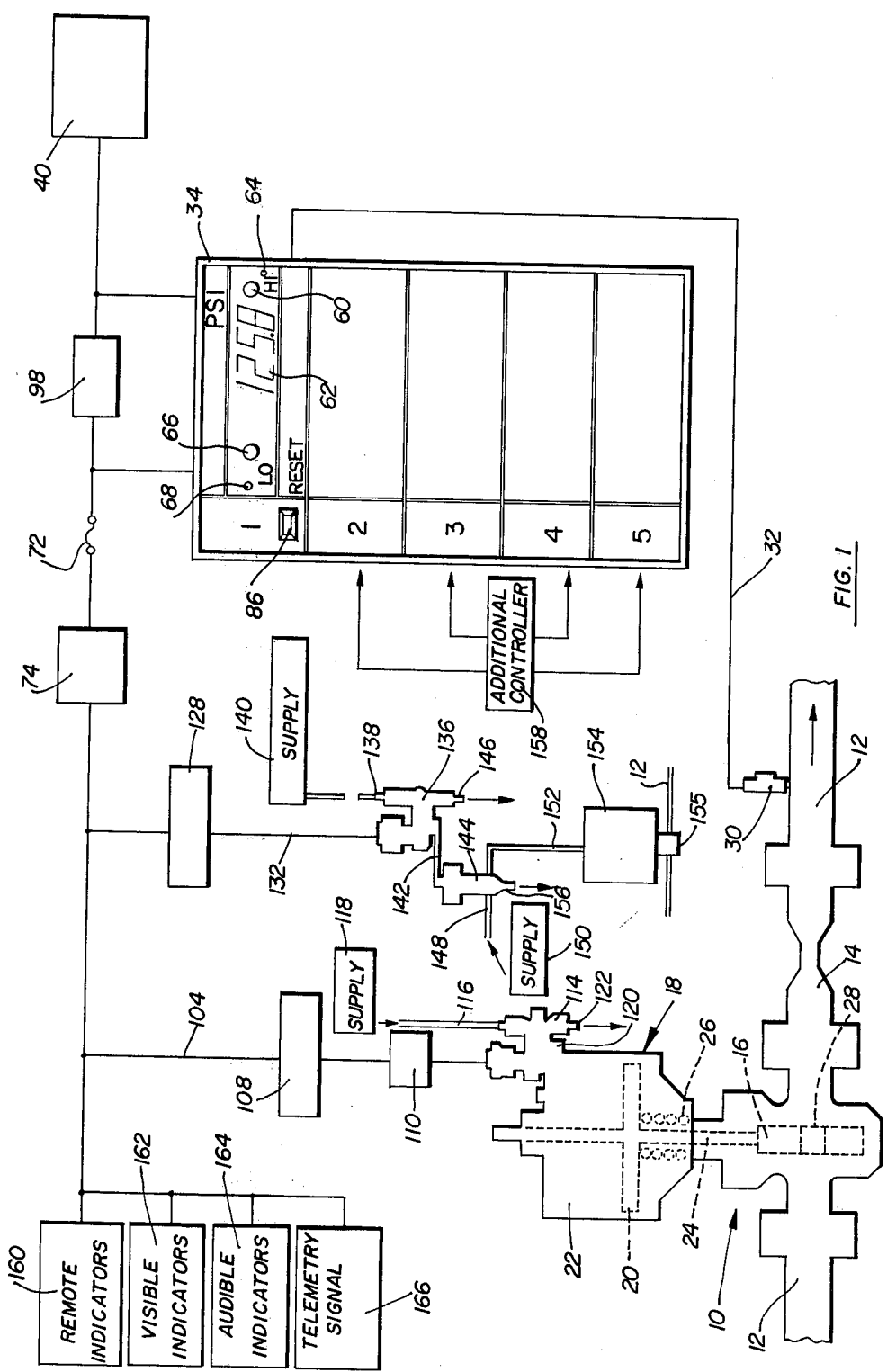
FIG. 1 is a diagrammatic view of an electro-pneumatic safety system constructed and arranged according to a preferred embodiment of the present invention.

Referring initially to FIG. 1, numeral 10 generally designates a surface safety valve in the form of a fluid actuated gate valve which is mounted to a fluid flowline 12 in order to control the flow of fluid therethrough. A choke 14 is connected with the downstream end of valve 10. Line 12 forms part of a production line of an oil or gas well having a subsurface safety valve located down in the well bore, as will be more fully explained. The portion of line 12 to which valve 10 is mounted extends out of the well bore above the surface, and valve 10 is normally located on or near the wellhead assembly (not shown).

Valve 10 includes a gate 16 which is moved between an open position and a closed position by a fluid actuator 18 which may be either a pneumatic or a hydraulic actuator. Actuator 18 includes a piston 20 which is mounted within a cylinder 22 and connected with a valve stem 24 extending upwardly from gate 16. A compression spring 26 continuously urges piston 20 upwardly toward a closed position of gate 16 wherein a port 28 of the gate is out of alignment with flowline 12. Application of pressurized fluid to the top face of piston 20 moves the piston downwardly to align port 28 with flowline 12 in the open position of the gate.

In accordance with the invention, a pressure transducer 30 is mounted to flowline 12 at a location downstream of choke 14. Pressure transducer 30 may be any suitable type which senses the fluid pressure in line 12 and provides, as the output of the transducer, an electrical signal along a conductor line 32 connected with the transducer. The electrical characteristics of the signal applied to line 32 are indicative of the pressure in line 12 as sensed by pressure transducer 30. Preferably, either the current or the voltage of the electrical signal is directly proportional to the sensed pressure. Conductor line 32 leads to a digital controller 34. In the preferred embodiment of the invention, controller 34 is an electronic device which is commercially available from Data Instruments, Inc. under the designation Signal Conditioner Model 101. Alternatively, controller 34 may be of the type which is commercially available from LFE Corporation, Process Control Division, 1601-T Trapelo Road, Waltham, MA 02154, under the designation LFE Digital Control Meter, Model No. 4424-K. It is contemplated that a pressure transmitter (not shown) will be used in place of transducer 30 in situations where controller 34 is far removed from line 12.

Figure 2:
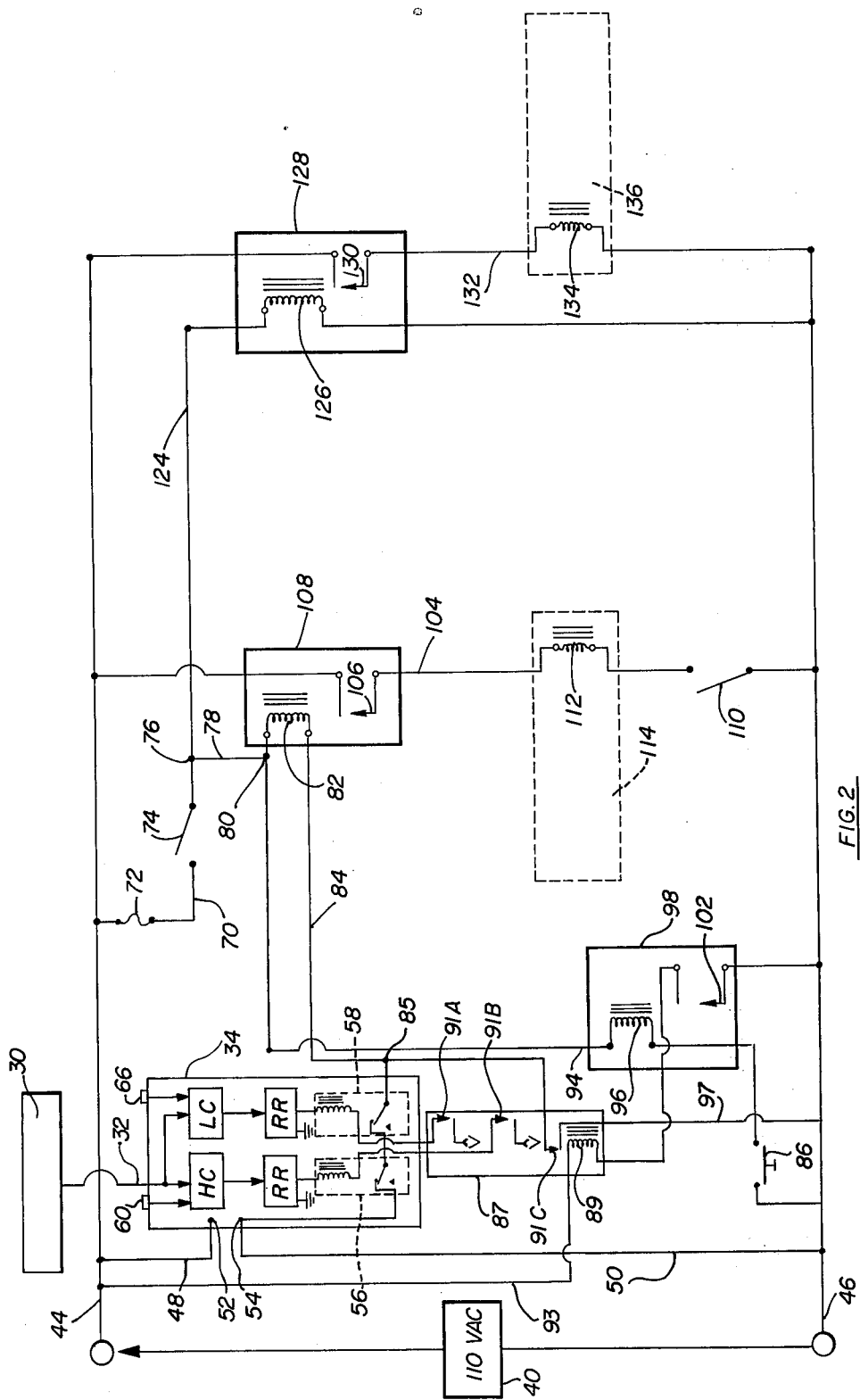
FIG. 2 is a schematic circuit diagram of the control circuit used in the safety system of FIG. 1.

With reference to FIG. 2, an AC power supply 40 is connected to a pair of electrical conductor lines 44 and 46. Controller 34 is connected between lines 44 and 46 by respective lines 48 and 50. Controller 34 has terminals 52 and 54 to which lines 48 and 50 respectively connect. Included in controller 34 are a high relay 56 and a low relay 58 which are both latching type relays of a well known type. The relay contacts are connected in series. As will be described, both relays are latched open whenever a deenergized condition occurs, including power failure. Thus, after either or both relays have been opened, they must be manually reset in a manner that will be made clear. Each relay has a second set of contacts (not shown) by which each relay is closed upon reset through a conventional holding circuit (also not shown) completed through the coil of each relay.

Controller 34 is shown in modified block diagram form in FIG. 2 and, as shown, the signal applied to line 32 by pressure transducer 30 is supplied as one input to both a high level comparator HC and a low level comparator LC. The high level with which the signal on line 32 is compared is provided as the other input to high level comparator HC, and this level is set by turning an adjustment button 60 located on the front panel of the controller (see FIG. 1). If the signal on line 32 exceeds the high level, a control signal is supplied to a relay reset RR and the relay reset interrupts the ground path for the coil of high relay 56. This effects interruption of the holding circuit through the coil of relay 56 and opening of relay 56. The relay switch moves to an open contact thus interrupting the series circuit mentioned above. Simultaneously, an indicator light 64 (FIG. 1) on the front panel, which indicator is a light emitting diode, is illuminated to provide a visual indication that the high level limit has been exceeded. Button 60 may be pushed to provide a digital display 62 of the high level setting.

The operation of controller 34 vis-a-vis relay 58 is similar to that of relay 56. An adjustment button 66 controls the low level input to comparator LC, and when the signal on line 32 falls below the low level limit, comparator LC supplies a signal to a second relay reset RR to interrupt the ground path for the coil of relay 58 and thus opens the relay. Again, the series circuit formed with the contacts of relays 56 and 58 is broken. An indicator light 68, also a light emitting diode, is illuminated simultaneously with the opening of relay 58 to provide a visual indication that the low level has been exceeded. Depressing of button 66 provides a display of the low level setting on display 62. When neither button 60 or 66 is depressed, display 62 provides an indication of the pressure level in flowline 12.

As shown in FIG. 2, the circuit which leads to relays 56 and 58 includes a conductor line 70 which connects with line 44 and is provided with a temperature sensitive fuse 72 and an emergency shutdown switch 74. Fuse 72 blows whenever the temperature to which it is exposed exceeds a predetermined high level such as occurs during a fire. Switch 74 may be manually opened in the event of an emergency situation. Line 70 leads to a node 76 from which a line 78 extends to another node 80. A relay coil 82 is connected between node 80 and a conductor line 84. Conductor line 84 is tied to line 46 via a node 85 and the series circuit formed by the contacts of relays 56 and 58, terminal 54 and line 50.

A manually operable reset switch 86 is located on the front panel of controller 34. Switch 86 is used to reset relays 56 and 58 during start up of the system through a secondary reset relay 87. Switch 86 is included in a conductor line 94 which extends from node 80 to connection with line 46. Included in line 94 is a coil 96 forming part of a time delay relay 98 having a switch 102. Relay 98 is a delay type relay of a well known type which temporarily moves switch 102 to the closed position upon energization of coil 96. After the elapse of a preset time period following the closing of switch 102, switch 102 opens. The time period during which switch 102 is closed may be adjusted as desired.

The secondary reset relay 87 is of the three-pole double throw type and includes a coil 89 and three switches 91A, 91B and 91C. Coil 89 is included in a conductor line 93 which extends from line 44 to line 46 through coil 89 and switch 102. Switch 91A is normally open and resets low relay 58 when closed due to energization of coil 89. Switch 91B is normally open and resets high relay 56 when closed due to energization of coil 89. Each switch 91A and 91B is interposed between a voltage source V in controller 34 and the corresponding relay reset RR to complete ground paths through the respective low and high relay resets RR when switches 91A and 91B are closed. Closing of switches 91A and 91B thus energizes the coils of relays 58 and 56 to close the switches of relays 58 and 56. The holding circuits (not shown) are then completed through the coils of relays 58 and 56 and the relay resets RR to maintain the relays energized when switches 91A and 91B subsequently open. Switch 91C is normally open and closes when coil 89 is energized. Switch 91C is included in a conductor line 97 which extends from node 85 to connection with line 46.

A conductor line 104 extends between lines 44 and 46 and includes a relay switch 106 which cooperates with coil 82 to provide a delay on operate type relay 108. Switch 106 is a normally open switch which closes only after coil 82 has been energized for a preset time period which may be adjusted as desired. Line 104 also includes a manually operated shut-in switch 110 and a coil 112 which forms the solenoid of a solenoid valve 114. As shown in FIG. 1, valve 114 has an inlet conduit 116 leading from a pressurized fluid source 118. When coil 112 is energized, valve 114 directs fluid from inlet conduit 116 to a conduit 120 which connects with cylinder 22 at a location above piston 20 in order to deliver pressurized fluid to the upper face of the piston for opening of gate 16. Deenergization of coil 112 causes valve 114 to close gate 16 by bleeding fluid from cylinder 22 through conduit 120 and out through a bleed port 122 of valve 114.

With reference again to FIG. 2, a line 124 extends from node 76 to connection with line 46. Line 124 includes a relay coil 126 forming part of a delay on release type relay 128. A switch 130 of relay 128 is included in a line 132 extending between lines 44 and 46. Switch 130 is a normally open switch which is held closed when coil 126 is energized and which opens only after coil 126 has been deenergized for a preset time period which may be adjusted as desired.

Line 132 also includes a coil 134 forming the solenoid of a solenoid valve 136. As shown in FIG. 1, valve 136 has an inlet conduit 138 which receives fluid from a pressurized fluid source 140. When coil 134 is energized, valve 136 directs fluid from inlet conduit 138 to another conduit 142 which leads to a control port of a dump valve 144. When coil 134 is deenergized, valve 136 bleeds the fluid from conduit 142 and directs the fluid out through a bleed port 146 of valve 136.

Dump valve 144 has an inlet conduit 148 which receives fluid from a pressurized fluid source 150. When pressurized fluid is applied through conduit 142 to the control port of dump valve 144, the dump valve directs fluid from conduit 148 to another conduit 152 which leads to a fluid actuator 154 for a subsurface safety valve 155. Valve 155 is typically a ball valve but may be any suitable type of valve which is mounted to line 12 at a location within the well bore. Valve 155 is typically mounted to the production tubing which forms the downhole portion of flowline 12. When pressurized fluid is applied to actuator 154 along line 152, the actuator closes the subsurface safety valve 155. When the pressure on control conduit 142 is relieved, dump valve 144 connects conduit 152 with a bleed port 156 in order to bleed fluid from actuator 154. A spring or the like (not shown) included in actuator 154 then acts to effect closing of the subsurface safety valve 155.

Additional controllers which are generally indicated at 158 in FIG. 1 may be connected with controller 34 in order to control flowlines other than line 12. Remote indicators 160, visible indicators 162, audible indicators 164, and a telemetry signal device 166 can be provided and will be activated whenever the circuit through controller 34 is interrupted. Visible indicators 162 provide flashing signals or other visual signals, audible indicators 164 sound buzzers, horns or the like, and device 166 provides a radio signal indicating that an abnormal pressure condition exists in line 12.

Activation of the safety system is effected by first assuring that switch 110 is closed and then closing the emergency shutdown switch 74. Prior to closing of switch 74, gate 16 and subsurface safety valve 155 are closed and the well is out of service with little or no pressure in line 12 downstream of valve 10. Closing of switch 74 immediately energizes coil 126 which causes immediate closing of switch 130 to complete the circuit through solenoid coil 134. Dump valve 144 is thus opened due to the application of pressure through conduit 142, and pressurized fluid is delivered through conduit 152 to actuator 154 in order to open subsurface safety valve 155.

Reset switch 86 may then be closed to place the safety system in operating condition. The circuit through coil 96 is completed from line 44 through lines 70, 78, and 94 to line 46, and energization of coil 96 closes switch 102 for a preset time interval. It should be noted that coil 96 cannot be energized unless switch 74 is closed. When switch 102 closes, a circuit is completed through line 93 to energize coil 89 and effect immediate closing of switches 91A, 91B, and 91C. Closing of switch 91C completes a start up circuit from line 44 through lines 70 and 78, coil 82, and lines 84 and 97 to line 46, thereby energizing coil 82. After a time delay which is set to assure that subsurface safety valve 155 has had sufficient time to fully open, switch 106 closes to complete the circuit through coil 112 which causes valve 114 to open such that pressurized fluid is delivered from source 118 to actuator 18 for opening of gate 16. Closing of switch 91B immediately energizes the coil of high relay 56 due to completion of the ground path through the high relay reset RR. After closing of switch 91A, the coil of low relay 58 is not energized until the pressure builds up above the low setting, since the ground path through low relay reset RR is interrupted prior to such time. However, the switch of relay 58 closes before the start up circuit through switch 91C is interrupted.

Once gate 16 has opened, the pressure in line 12 begins to build up downstream of valve 10 and eventually comes into the range of controller 34 above the setting of low relay 58 and below the setting of high relay 56. When this occurs, pressure transducer 30 applies a signal to line 32 which is within the operating range of controller 34, and the unlatched switches of relays 56 and 58 are closed to complete a circuit from line 44 through lines 70 and 78, coil 82, line 84, relays 58 and 56 and line 50 to line 46. Once the time delay corresponding to the setting of relay 98 has elapsed, the circuit through relays 56 and 58 alone maintains coil 82 in the energized condition, because switch 102 opens to deenergize coil 89 and interrupt the start up circuit due to the opening of switch 91C. It is noted that coil 89 remains energized throughout the time period during which the pressure in line 12 is building up to the operating range of the safety system. After coil 89 is deenergized to effect opening of switches 91A and 91B, the holding circuits (not shown) remain completed through the coils of relays 56 and 58 to maintain the switches of relays 56 and 58 closed so long as the pressure in line 12 is within the operating range of the system.

When the pressure in line 12 is within the normal range, relays 56 and 58 remain closed to maintain coil 82 in the energized condition. However, if the pressure in line 12 falls below the level corresponding to the setting of low relay 58 or exceeds the level corresponding to the setting of high relay 56, the appropriate relay 56 or 58 opens and remains in the open position until manually reset. The circuit through coil 82 is thus interrupted and switch 106 opens immediately to break the circuit through coil 112. Solenoid valve 114 immediately bleeds actuator 18 through bleed port 122, and spring 26 closes gate 16 to close line 12 and shut-in the well. The condition of controller 34 does not affect subsurface safety valve 155 and the subsurface valve thus remains open.

If the safety system is in service and a fire occurs to blow fuse 72 or if the emergency shutdown switch 74 is manually opened, the circuits to coils 82 and 126 are immediately interrupted. Switch 106 opens immediately to deenergize coil 112, thereby effecting immediate closing of gate 16 in the manner described previously. Due to the time delay of relay 128, switch 130 opens only after a time delay sufficient to assure that gate 16 has fully closed to shut-in the well. Only then is solenoid 134 deenergized to permit solenoid valve 136 to bleed fluid from conduit 142 through bleed port 146. Dump valve 144 then bleeds actuator 154 through port 156 in order to effect closing of subsurface safety valve 155. The well is thus eventually shut-in by both surface valve 10 and subsurface valve 155 although the subsurface valve closes after the surface safety valve. It should be apparent that the pressure in line 12 drops downstream of valve 10 after closing of gate 16, and that low relay 58 opens due to the pressure drop.

Valve 10 can also be closed by opening switch 110 manually. The circuit through coil 112 is immediately broken to cause gate 16 to move to the closed position. The resultant pressure drop in flowline 12 subsequently causes relay 58 to open since the low pressure is sensed by pressure transducer 30 and the corresponding electrical signal is applied to line 32 at a level below the setting for opening of relay 58. Opening of switch 110 does not affect the condition of subsurface safety valve 155.

When either relay 56 or 58 of controller 34 opens, the holding circuit (not shown) through its coil is interrupted and the relay is thus latched in the open position such that gate 16 remains closed even if the pressure returns to the operating range of the safety system. Accordingly, when the safety system fires due to manual opening of switch 74 or switch 110, due to blowing of fuse 72, or due to an unduly high or low pressure condition in line 12, the safety system is automatically locked out and must be positively reset by manually closing switch 86 in order to unlatch relays 56 and 58 from the open position to return the safety system to service. After either or both relays 56 and 58 have opened, they are held in the open position and cannot be closed until contacts 91A and 91B are closed due to energization of coil 89, which can be effected only by manual depression of reset switch 86.

In the event of an electrical power failure, all coils in the safety system are immediately deenergized and the relays 56 and 58 of controller 34 are latched in the open position, requiring manual start-up through switch 86 even if power resumes and the pressure in line 12 is within the operating range of the safety system. However, a power failure deenergizes coil 134 at the same time as coil 112 so that subsurface valve 155 closes at the same time as surface valve 10, rather than after a time delay. In order to avoid such a situation and provide protection for the subsurface safety valve 155, the hydraulic or pneumatic delay arrangement shown in FIG. 3 can be provided to control actuator 154.

The hydraulic or pneumatic control circuit of FIG. 3 replaces dump valve 144 and the associated fluid conduits. In their place, fluid conduit 142 connects with a conduit 168 having a restricted orifice 170 therein. Conduit 168 connects with another conduit 172 leading to an accumulator 174 from which line 176 extends to actuator 154. Extending in parallel relation to conduit 168 in a fluid conduit 178 which bypasses orifice 170. Conduit 178 includes a check valve 180 which permits fluid flow only in a direction from conduit 142 toward conduit 172. The remainder of the safety system is identical to that described previously in connection with FIGS. 1 and 2.

A safety system having the FIG. 3 arrangement functions the same as that described in connection with FIGS. 1 and 2, except in the event of an electrical power failure. Then, coil 134 is immediately deenergized and valve 136 shifts to a position wherein conduit 142 is in communication with bleed port 146. Actuator 154 is slowly bled of fluid due to the presence of the restricted orifice 170 in conduit 168. Consequently, complete bleeding of fluid from actuator 154 is delayed and the subsurface valve 155 closes only after a time delay which depends upon the extent of the restriction provided by orifice 170. The time delay is selected to assure that the surface safety valve 10 is completely closed prior to closing of the subsurface valve 155.

When coil 134 is energized to maintain valve 136 in the position of FIG. 3, fluid from conduit 138 is delivered to conduit 142 and is able to bypass orifice 170 through conduit 178, as permitted by check valve 180. As a result, there is no appreciable delay in the delivery of fluid to actuator 154 for opening of subsurface valve 155.

FIG. 4 illustrates a modified control circuit which is generally similar to the circuit shown in FIG. 2. The same reference numerals are applied in FIG. 4 to identify components which are the same as those of the FIG. 2 circuit. The circuit of FIG. 4 is arranged to control subsurface safety valve 155 through controller 34, and to that end, line 124 extends from node 76 to connection with an added line 125 in the FIG. 4 embodiments, rather than connecting with line 46 as the FIG. 2 embodiment. Line 125 connects at its opposite end with line 84 at a location between coil 82 and node 85. In all other respects, the circuit shown in FIG. 4 is identical to that described in connection with FIG. 2.

The control system of FIG. 4 functions in the same manner as that of FIGS. 1 and 2 in the event of a fire blowing fuse 72 or an emergency shutdown effected by opening switch 74, and also if switch 110 is manually opened or if there is an electrical power failure. It is to be understood that the arrangement shown in FIG. 3 can be used with the circuit of FIG. 4 in order to hydraulically or pneumatically delay closing of subsurface safety valve 155 if a power failure should occur.

To activate the safety system which includes the FIG. 4 control circuit, switch 74 is closed followed by closing of reset switch 86. It is noted, however, that closing of switch 74 does not open the subsurface safety valve 155 until switch 91C also closes. Otherwise, start-up of the system is accomplished in the same manner as with the system described in connection with FIGS. 1 and 2.

When the safety system of FIG. 4 is in service and the pressure in flowline 12 drops below the setting of relay 58 or rises above the setting of relay 56, the appropriate relay 56 or 58 is latched in the open position to interrupt the circuit through coil 82 and the circuit through coil 126. These circuits are completed only through controller 34 since switch 91C is open following elapse of a preset time delay following energization of coil 96. When coil 82 is deenergized due to opening of relay 56 or 58, switch 106 opens immediately to effect deenergization of coil 112 and immediate closing of gate 16. After the time delay provided by relay 128, switch 130 opens to deenergize solenoid coil 134 and effect closing of subsurface safety valve 155. It is thus apparent that when the pressure in flowline 12 is outside of the preset operating range of controller 34, surface valve 10 closes immediately in automatic fashion followed by automatic closing of subsurface valve 155. The time delay provided by relay 128 is set to assure that the surface safety valve 10 is fully closed before the subsurface safety valve 155 closes.

What is claimed is:

1. In a safety system for a fluid flowline having a safety valve movable between open and closed positions to respectively open and close the flowline, the improvement comprising:
    pressure transducer means for sensing the fluid pressure in the flowline and providing an electrical signal indicative of the sensed fluid pressure;
    electrical control means having a low setting corresponding to a preselected low pressure level in the flowline and a high setting corresponding to a preselected high pressure level in the flowline, said control means receiving the electrical signal from said transducer means and detecting when said signal is within a predetermined range defined between said low setting and said high setting;
    valve actuator means for maintaining said safety valve in the open position when the signal detected by said control means is within said predetermined range and for moving the safety valve to the close position when the signal detected by said control means is outside of said predetermined range;
    means for maintaining said safety valve in the closed position when the signal provided by said transducer means returns to said predetermined range after having been detected outside of said predetermined range;

manually operated means to override said means for maintaining said safety valve in the closed position for reopening said safety valve; and manually operated shutdown means effective to close said safety valve independently of said electrical control means.

2. The improvement of claim 1, wherein said control means includes means for varying said low setting and said high setting to vary said predetermined range.

3. A safety system for closing a fluid flowline when the fluid pressure therein is outside of a predetermined pressure range defined between a preselected low pressure level and a preselected high pressure level, said safety system comprising:

a safety valve for the flowline having an open position wherein the flowline is open and a closed position wherein the flowline is closed;

a fluid actuator connected with said safety valve and operable to maintain the valve in its open position when fluid pressure is applied to the actuator, said actuator having means for moving the safety valve to its closed position upon bleeding of fluid from the actuator;

a source of fluid under pressure for applying pressurized fluid to said actuator;

a solenoid valve connected between said source and actuator to control the flow of fluid therebetween, said solenoid valve having an energized condition wherein fluid flow from said source to said actuator is permitted and a deenergized condition wherein said actuator is bled of fluid to move the safety valve to the closed position;

means for sensing the fluid pressure in said flowline;

electrical control means for maintaining said solenoid valve in the energized condition when the pressure sensed by said sensing means is within said predetermined pressure range, said control means being operable to maintain said solenoid valve in the deenergized condition when the pressure sensed by said sensing means is outside of said predetermined pressure range;

means for preventing said solenoid valve from returning to the energized condition after having been in the deenergized condition; and manually operated reset means for resetting said solenoid valve in the energized condition from the deenergized condition to override said preventing means.

4. A safety system as set forth in claim 3, including manually operated shutdown means effective to deenergize said solenoid valve independently of said control means.

5. A safety system as set forth in claim 3, including temperature sensitive means for effecting the deenergized condition of said solenoid valve when the temperature sensitive means is exposed to a temperature above a predetermined level.

6. A safety system as set forth in claim 3, including:

a second safety valve for the flowline located upstream of the first mentioned safety valve, said second valve having an open position wherein the flowline is open and a closed position wherein the flowline is closed;

fluid actuator means for receiving pressurized fluid to maintain said second safety valve in the open position and for moving said second valve to the closed position upon bleeding of fluid from the actuator means;

a supply of pressurized fluid;

a second solenoid valve connected between said fluid supply and said actuator means to control the flow of fluid therebetween, said second solenoid valve having an energized condition wherein flow of fluid from said fluid supply to said actuator means is permitted and a deenergized condition wherein said actuator means is bled of fluid to move the second safety valve to the closed position;

manually operated shutdown means for effecting the deenergized condition of the first and second solenoid valves independently of said control means; and means providing a time delay between movement of the first safety valve to its closed position and movement of the second safety valve to its closed position when said shutdown means is operated.

7. A safety system as set forth in claim 6, wherein said fluid flowline extends partially within a well bore and includes a downstream portion to which the first safety valve is mounted at a location out of the well bore, said second safety valve being a subsurface valve located in the well bore.

8. In a safety system for a fluid flowline having a safety valve movable between open and closed positions to respectively open and close the flowline, the improvement comprising:

control means including an electrical control circuit having a high relay and a low relay arranged in series, said control circuit being completed when both relays are in a closed position and being interrupted when either relay is in an open position;

a pressure sensor connected with the flowline to sense the fluid pressure therein, said pressure sensor applying to said control means a signal indicative of the sensed fluid pressure;

means for maintaining the low relay in the closed position when the signal applied to said control means is above a preselected low level corresponding to a low pressure level in the flowline, and for moving the low relay to the open position when said signal is below said preselected low level;

means for maintaining the high relay in the closed position when the signal applied to said control means is below a preselected high level corresponding to a high pressure level in the flowline, and for moving the high relay to the open position when said signal is above said preselected high level;

means for releasably latching said low and high relays in the open position when moved thereto, thereby preventing said control circuit from being completed following interruption thereof;

actuator means for maintaining the safety valve in its open position when said control circuit is completed and for moving the safety valve to its closed position when said control circuit is interrupted; and manually operated reset means for unlatching said relays from the open position to override said releasable latching means.

9. The improvement set forth in claim 8, including a manually operated switch in said control circuit which may be opened to interrupt said control circuit when both relays are closed.

10. The improvement set forth in claim 8, including an electric start-up circuit and means for completing said start-up circuit independently of said control circuit, said actuator means moving said safety valve to the open position upon completion of said start-up circuit.

11. The improvement set forth in claim 10, including means for automatically interrupting said start-up circuit upon elapse of a predetermined time delay following completion thereof.

12. The improvement set forth in claim 11, including means for maintaining said relays unlatched from the open position at all times during which said start-up circuit is completed.

13. The improvement set forth in claim 8, including temperature sensitive means for interrupting said control circuit when said temperature sensitive means is exposed to a temperature in excess of a predetermined level.

14. The improvement set forth in claim 9, wherein said flowline extends partially within a well bore and includes a downstream portion to which the safety valve is mounted at a location out of the well bore to provide a surface safety valve, said safety system further including:
- a subsurface safety valve mounted to the flowline at a location within the well bore, said subsurface safety valve having an open position wherein the flowline is open and a closed position wherein the flowline is closed;
- a second electrical control circuit operable when completed to maintain the subsurface valve in the open position and when interrupted to effect movement of the subsurface valve to the closed position;
- manually operated shutdown means for interrupting the first mentioned control circuit and the second control circuit; and
- means providing a time delay between movement of the surface safety valve to the closed position and movement of the subsurface safety valve to the closed position when said shutdown means is operated.

15. The improvement set forth in claim 14, including:
- a start-up circuit operable when completed to effect movement of both safety valves to the open position;
- manually operated switch means for completing said start-up circuit; and
- means providing a time delay between movement of said subsurface safety valve to the open position and movement of said surface safety valve to the open position upon operation of said switch means to complete the start-up circuit.

16. A pressure responsive safety system for a fluid flowline extending partially within a well bore and having a downstream portion extending out of the well bore, said safety system comprising:
- a surface safety valve mounted to said downstream portion of the flowline at a location out of the well bore, said surface safety valve being movable between open and closed positions relative to the flowline;
- an actuator for said surface safety valve having an activated condition wherein the surface safety valve is maintained in the open position and a deactivated condition wherein the surface safety valve is maintained in the closed position;
- a subsurface safety valve mounted to the flowline at a location within the well bore, said subsurface valve being movable between open and closed positions relative to the flowline;
- an actuator for said subsurface safety valve having an activated condition wherein the subsurface valve is maintained in the open position and a deactivated condition wherein the subsurface valve is maintained in the closed position;
- means for sensing the pressure in said flowline and providing a signal indicative of the sensed pressure;
- electrical control means having preselected low and high settings corresponding to respective low and high pressure levels in the flowline, said control means receiving the signal from said sensing means and detecting when said signal is within a predetermined range defined between said low and high settings;
- means for maintaining said actuator for the surface safety valve in the activated condition when the signal detected by said control means is within said predetermined range and for effecting the deactivated condition of said surface safety valve actuator when said signal is outside of said predetermined range;
- manually operable shutdown means for effecting the deactivated condition of said surface safety valve actuator and said subsurface safety valve actuator independently of said control means, thereby effecting movement of said surface and subsurface valves to the closed positions; and
- means providing a time delay between movement of said surface safety valve to the closed position and movement of said subsurface safety valve to the closed position.

17. A safety system as set forth in claim 16, including means for preventing said actuator for the surface safety valve from returning to the activated condition from the deactivated condition.

18. A safety system as set forth in claim 16, including temperature sensitive means for effecting the deactivated condition of said surface safety valve actuator and said subsurface safety valve actuator when said temperature sensitive means is exposed to a predetermined high temperature.

19. A safety system as set forth in claim 16, including manually operable switch means for effecting the deactivated condition of said surface safety valve actuator while said subsurface safety valve actuator remains in the activated condition.

20. A safety system as set forth in claim 16, wherein said actuator for the subsurface safety valve is a fluid actuator operable upon receipt of pressurized fluid to maintain the subsurface valve in the open position and having means for moving the subsurface valve to the closed position upon bleeding of fluid from the fluid actuator, said time delay means including:
- a source of fluid under pressure;
- a fluid control valve connected between said source and said fluid actuator to control the flow of fluid therebetween, said control valve having a first position wherein fluid is directed from said source to said fluid actuator and a second position wherein fluid is bled from the fluid actuator;
- means for effecting movement of said control valve from the first position to the second position when said shutdown means is operated; and
- means for restricting the flow of fluid from the fluid actuator toward the control valve to thereby delay bleeding of the fluid actuator.

21. A safety system as set forth in claim 20, wherein said restricting means includes:
- first and second fluid lines extending between said control valve and fluid actuator;
- means for blocking said first line to flow in a direction from said fluid actuator toward said control valve; and
- an orifice in said second line restricting the rate of flow therethrough whereby fluid is delivered to said fluid actuator along said first line at a greater rate than fluid is bled from said fluid actuator along said second line.

22. A safety system as set forth in claim 16, including:
- start-up means for effecting the energized condition of both actuators independently of said control means; and
- means providing time delay between movement of said subsurface safety valve to the open position and movement of said surface safety valve to the open position upon activation of said start-up means.

23. A pressure responsive safety system for a fluid flowline extending partially within a well bore and having a downstream portion extending out of the well bore, said safety system comprising:
- a surface safety valve mounted to said downstream portion of the flowline at a location out of the well bore, said surface safety valve being movable between open and closed positions relative to the flowline;
- an actuator for said surface safety valve having an activated condition wherein the surface safety valve is maintained in the open position and a deactivated condition wherein the surface safety valve is maintained in the closed position;
- a subsurface safety valve mounted to the flowline at a location within the well bore, said subsurface valve being movable between open and closed positions relative to the flowline;
- an actuator for said subsurface safety valve having an activated condition wherein the subsurface valve is maintained in the open position and a deactivated condition wherein the subsurface valve is maintained in the closed position;
- means for sensing the pressure in said flowline and providing an electric signal indicative of the sensed pressure;
- electrical control means having preselected low and high settings corresponding to respective low and high pressure levels in the flowline, said control means receiving the electric signal from said sensing means and detecting when said signal is within a predetermined range defined between the low and high settings; and
- means for maintaining each actuator in the activated condition thereof when the signal detected by said control means is within said predetermined range and for effecting the deactivated condition of each actuator when said signal is outside of said predetermined range.

24. A safety system as set forth in claim 23, including temperature sensitive means for effecting the deactivated condition of each actuator when the temperature sensitive means is exposed to a predetermined high temperature.

25. A safety system as set forth in claim 23, including manually operable switch means for effecting the deactivated condition of said surface safety valve actuator while said subsurface safety valve actuator remains in the activated condition.

26. A satefy system as set forth in claim 23, including means providing a time delay between movement of said surface safety valve to the closed position and movement of said subsurface safety valve to the closed position when the electrical signal detected by said control means is outside of said predetermined range.

27. A safety system as set forth in claim 23, including means for preventing each actuator from reverting to the activated condition from the deactivated condition.

28. A safety system as set forth in claim 27, including:
- start-up means for overriding said preventing means to effect the activated condition of each actuator independently of said control means; and
- means providing a time delay between movement of said subsurface safety valve to the open position and movement of said surface safety valve to the open position upon operation of said start-up means.

* * * * *